(12) United States Patent
Naffziger et al.

(10) Patent No.: US 8,510,582 B2
(45) Date of Patent: Aug. 13, 2013

(54) MANAGING CURRENT AND POWER IN A COMPUTING SYSTEM

(75) Inventors: Samuel D. Naffziger, Fort Collins, CO (US); Sebastien J. Nussbaum, Lexington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 316 days.

(21) Appl. No.: 12/840,813

(22) Filed: Jul. 21, 2010

(65) Prior Publication Data

US 2012/0023345 A1    Jan. 26, 2012

(51) Int. Cl.
*G06F 1/32* (2006.01)

(52) U.S. Cl.
CPC .............. *G06F 1/324* (2013.01); *G06F 1/3243* (2013.01); *G06F 1/3296* (2013.01)
USPC ............................ 713/323; 713/324; 713/340

(58) Field of Classification Search
USPC .......................................................... 713/300
See application file for complete search history.

(56) References Cited

U.S. PATENT DOCUMENTS

| | | | |
|---|---|---|---|
| 5,712,826 A | 1/1998 | Wong et al. | |
| 5,764,089 A | 6/1998 | Partovi et al. | |
| 5,917,355 A | 6/1999 | Klass | |
| 6,055,640 A * | 4/2000 | Kageshima et al. | 713/320 |
| 6,278,308 B1 | 8/2001 | Partovi et al. | |
| 6,473,732 B1 | 10/2002 | Chen | |
| 6,597,620 B1 | 7/2003 | McMinn | |
| 6,611,435 B2 | 8/2003 | Kumar | |
| 6,636,977 B1 * | 10/2003 | Chen | 713/340 |
| 6,836,849 B2 * | 12/2004 | Brock et al. | 713/310 |
| 7,301,373 B1 | 11/2007 | Bailey et al. | |
| 7,409,568 B2 | 8/2008 | Tam | |
| 7,420,378 B2 | 9/2008 | Audet | |
| 7,454,637 B2 | 11/2008 | Er | |
| 7,464,276 B2 | 12/2008 | Rusu | |
| 7,498,694 B2 | 3/2009 | Luo | |
| 7,502,948 B2 * | 3/2009 | Rotem et al. | 713/300 |
| 7,565,562 B2 * | 7/2009 | Chary | 713/324 |
| 7,617,406 B2 * | 11/2009 | Yasuo | 713/320 |

(Continued)

OTHER PUBLICATIONS

Tanenbaum, Andrew S.; "Structured Computer Organization"; Prentice-Hall, Inc.; 1990; Third Edition; pp. 11-13.*

(Continued)

*Primary Examiner* — Ryan Stiglic
(74) *Attorney, Agent, or Firm* — Rory D. Rankin; Meyertons, Hood, Kivlin, Kowert & Goetzel, P.C.

(57) ABSTRACT

A system and method for efficient power transfer on a die. A semiconductor chip comprises on a die two or more computation units (CUs) utilizing at least two different voltage regulators and a power manager. The power manager reallocates power credits across the die when it detects an activity level of a given CU is below a given threshold. In response to receiving a corresponding number of donated power credits, each of the one or more selected CUs maintains a high activity level with a high performance P-state. When a corresponding workload increases, each CU maintains operation and an average power consumption corresponding to the high performance P-state by alternating between at least two different operational voltages. When the operational voltage drops during the alternation, the current drawn by the particular CU may exceed a given current limit. The power manager detects this current limit is exceeded and accordingly reallocates the power credits across the die.

20 Claims, 8 Drawing Sheets

(56) References Cited

U.S. PATENT DOCUMENTS

| | | | |
|---|---|---|---|
| 7,664,971 B2* | 2/2010 | Oh | 713/300 |
| 7,702,938 B2* | 4/2010 | Ha | 713/323 |
| 7,818,596 B2* | 10/2010 | Fenger et al. | 713/322 |
| 7,966,511 B2* | 6/2011 | Naveh et al. | 713/501 |
| 8,064,197 B2* | 11/2011 | Mowry et al. | 361/679.53 |
| 8,069,359 B2* | 11/2011 | Tolentino | 713/321 |
| 8,108,703 B2* | 1/2012 | Bahali et al. | 713/320 |
| 8,145,927 B2* | 3/2012 | Okitsu et al. | 713/320 |
| 2003/0110012 A1* | 6/2003 | Orenstien et al. | 702/188 |
| 2003/0149904 A1* | 8/2003 | Kim | 713/330 |
| 2005/0050373 A1* | 3/2005 | Orenstien et al. | 713/320 |
| 2006/0090161 A1* | 4/2006 | Bodas et al. | 718/100 |
| 2006/0112286 A1* | 5/2006 | Whalley et al. | 713/300 |
| 2006/0149975 A1* | 7/2006 | Rotem et al. | 713/300 |
| 2006/0236140 A1* | 10/2006 | Tanaka | 713/300 |
| 2006/0259793 A1* | 11/2006 | Moore et al. | 713/300 |
| 2006/0288243 A1* | 12/2006 | Kim | 713/300 |
| 2007/0156370 A1 | 7/2007 | White et al. | |
| 2008/0005591 A1* | 1/2008 | Trautman et al. | 713/300 |
| 2008/0098242 A1 | 4/2008 | Peterson | |
| 2008/0172565 A1 | 7/2008 | Chu et al. | |
| 2009/0049315 A1* | 2/2009 | Diab et al. | 713/310 |
| 2009/0153109 A1* | 6/2009 | Koertzen et al. | 323/268 |
| 2009/0230769 A1* | 9/2009 | Aerts | 307/32 |
| 2009/0254909 A1* | 10/2009 | Hanson et al. | 718/102 |
| 2009/0259345 A1* | 10/2009 | Kato et al. | 700/295 |
| 2010/0115304 A1* | 5/2010 | Finkelstein et al. | 713/320 |
| 2010/0162023 A1* | 6/2010 | Rotem et al. | 713/340 |
| 2010/0296238 A1* | 11/2010 | Mowry et al. | 361/679.53 |
| 2011/0113273 A1* | 5/2011 | Okitsu et al. | 713/320 |

OTHER PUBLICATIONS

International Search Report and Written Opinion for Application No. PCT/US2011/043978 mailed Oct. 7, 2011.

Fischer, et al; "A 90nm Variable-Frequency Clock System for a Power-Managed Itanium®-Family Processor"; Solid-State Circuits Conference, 2005. Digest of Technical Papers. ISSCC. 2005 IEEE International, Publication Date: Feb. 10-10, 2005, pp. 294-295 & 599. vol. 1, San Francisco, CA, ISSN: 0193-6530, ISBN: 0-7803-8904-2.

Karnik, et al "Scaling trends of Cosmic Rays induced Soft Errors in static latches beyond 0.18 pts" 2001 Symposium on VLSI Circuits of Technical Papers, pp. 61-62.

Goel, et al "Low-Overhead Design of Soft-Error-Tolerant Scan Flip-Flops with Enhanced-Scan Capability" 2006 Asia and South Pacific Conference on Design Automation, Jan. 24-27, 2006 pp. 665-670.

Krishnamohan, et al "A Highly-Efficient Techniques for Reducing Soft Errors in Static CMOS Circuits" pp. 126-131, 2004 IEEE International Conference on Computer Design (ICCD'04), 2004.

* cited by examiner

Power Borrowing De-rating Table 400

| Activity Level Comparisons | De-rated Power Borrowing Value to sum with a Thermal Design Power Value |
|---|---|
| Computation Unit Activity Level (CUAL) > High Threshold | 0 |
| High Threshold ≥ CUAL > Middle Threshold | Default Power Borrowing Value (DPBV) >> 2 (divide by 4) |
| Middle Threshold ≥ CUAL > Low Threshold | DPBV >> 1 (divide by 2) |
| Low Threshold ≥ CUAL | DPBV |

FIG. 4

MANAGING CURRENT AND POWER IN A COMPUTING SYSTEM

BACKGROUND OF THE INVENTION

1. Field of the Invention

This invention relates to computing systems, and more particularly, to efficient die power management.

2. Description of the Relevant Art

The power consumption of modern integrated circuits (IC's) has become an increasing design issue with each generation of semiconductor chips. As power consumption increases, more costly cooling systems such as larger fans, larger heat sinks and systems to control ambient temperature are utilized to remove excess heat and prevent IC failure. However, cooling systems increase the system cost. The IC power dissipation constraint is not only an issue for portable computers and mobile communication devices, but also for high-performance superscalar microprocessors, which may include multiple processor cores, or cores, and multiple pipelines within a core.

In order to manage power consumption, a chip-level power management system may transfer power credits from a first on-die component to a second on-die component. In such a case, the first on-die component may be operating in a mode corresponding to given normal or high power consumption. In contrast, the second on-die component may have an activity level below a given threshold. In some cases, these on-die components may be coupled to separate voltage planes. Transferring power away from the active second component to the relatively inactive first component may allow the second component to further increase its activity level or maintain its current activity level for a longer duration of time. In such a case, on-chip performance may increase without creating further cooling efforts from the cooling system. However, transferring power to the second on-die component may tax support systems for the second component such as a voltage regulator.

As is well known in the art, a processor is able to dissipate a maximum power, which is larger than a thermal design power (TDP). The TDP is the amount of power that a cooling system can dissipate. Therefore, to prevent failure, a processor typically operates within the TDP value. This TDP value may be used within logic in a component to select an operating mode. For example, an operational voltage and frequency combination may be chosen based at least on the TDP value. Similarly, a voltage regulator is able to supply a peak current, which is larger than a thermal design current (TDC). The TDC is the amount of current supplied for given operating conditions (e.g., normal to high operating conditions). In some cases, the value for the TDC may be insufficient to support increased activity for the second component discussed above where the increased activity is caused by the power transfer. Although on-chip performance may increase by allowing power transfer between components, the cost of modifying the voltage regulator to support a higher TDC is significant.

In view of the above, efficient methods and mechanisms for efficient die power management are desired.

SUMMARY OF EMBODIMENTS OF THE INVENTION

Systems and methods for efficient power transfer on a die are contemplated.

In one embodiment, a semiconductor chip comprises two or more computation units (CUs) and a power manager. In some embodiment, each of the CUs may utilize a different voltage regulator. At least two of the CUs operate in any one of several discrete power-performance states (P-states). Data indicative of an activity level of each of the CUs may also be made available. For example, in one embodiment the CUs measure a corresponding activity level and convey (or otherwise make available) data indicative of the measured levels to a power manager. In one embodiment, the power manager detects when an activity level of a given CU is below a given threshold. The power manager may then select one or more CUs of the plurality of CUs other than the given CU to receive donated power credits from the given CU. The power manager may determine a number of power credits to donate to a selected CU based at least in part on a corresponding activity level. The power manager conveys the respective number of power credits to the selected CU. In response to receiving additional (donated) power credits, the selected CU may transition to a different P-state. Also contemplated are embodiments wherein a particular CU of the one or more selected CUs may operate at a higher performance P-state when a workload of the particular CU increases. In some embodiments, the particular CU may maintain an average power consumption corresponding to the higher P-state despite a changing workload by altering operational voltages and frequency. For example, when the operational voltage is reduced, the current drawn by the particular CU may be increased to generally maintain a relatively constant average power consumption. In some embodiments, a thermal design current (TDC) may be established for a given component (e.g., voltage regulator). The established TDC may represent a maximum current draw above which safe and stable operation may not be guaranteed. In various embodiments, the transfer of power credits may result in an increased current which exceeds a TDC. In such a case, the power manager or other component may detect this condition and cause the component which is exceeding the TDC to reduce its current draw. In one embodiment, the power manager causes a component to reduce its current draw by removing power credits which were previously donated to the component. Removing such power credits may then cause a reduction in the P-state that the component is operating in, reduce power consumption, and reduce current draw of the component.

These and other embodiments will be further appreciated upon reference to the following description and drawings.

BRIEF DESCRIPTION OF THE DRAWINGS

FIG. 4 is a generalized block diagram of one embodiment of a power borrowing de-rating table.

Figure 1:
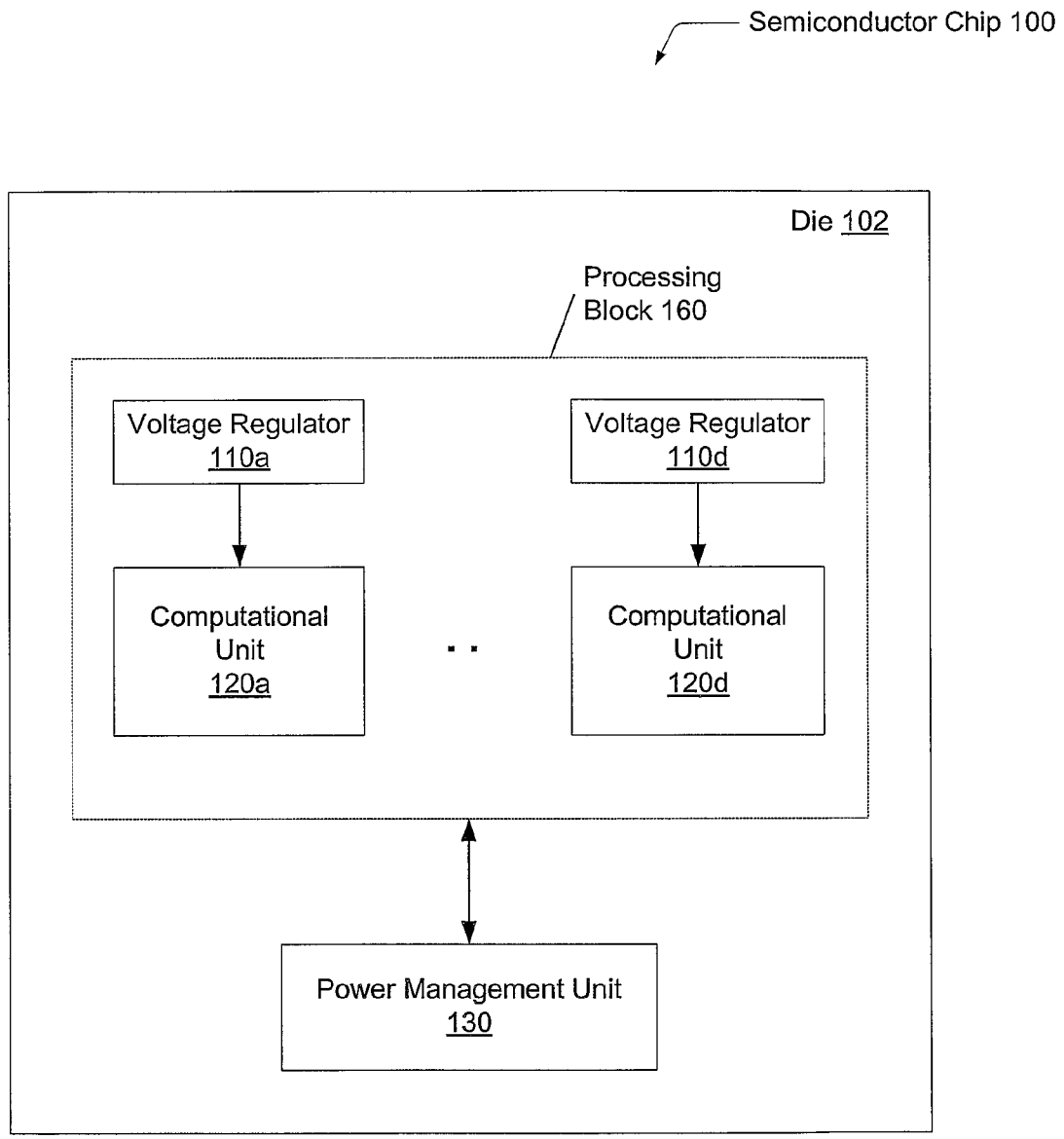
FIG. 1 is a generalized block diagram of one embodiment of a semiconductor chip.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of a generalized block diagram of a semiconductor chip 100 is shown. Interfaces for die 102 used to communicate with other components such as a memory controller, a network interface card (NIC), peripheral devices, and so forth, are not shown for ease of illustration. Die 102 may comprise a processing block 160 coupled to a power management unit 130. The processing block 160 may comprise computation units 120a-120d. As used herein, elements referred to by a reference numeral followed by a letter may be collectively referred to by the numeral alone. For example, computation units 120a-120d may be collectively referred to as computation units 120. Any transistor family may be use to implement die 102. Examples include metal oxide semiconductor field effect transistors (MOSFETs) and bipolar junction transistors (BJTs). Each computation unit 120 may operate on a separate voltage plane. Accordingly, each computation unit 120 may be coupled to a separate voltage regulator 110. For example, computation unit 120a is coupled to voltage regulator 110a. Computation unit 120d is coupled to voltage regulator 110d.

In one embodiment, computation units 120 may be processors. Each computation unit 120 may be one of general-purpose processors, graphics processors, special-purpose coprocessors, and so forth. Alternatively, each computation unit 120 may be an application specific integrated circuit (ASIC). A power target may be assigned to die 102. The power target is a thermal design power value for the die 102. The thermal design power (TDP), which may be also referred to as a thermal design point, represents a maximum amount of power a cooling system in a computer is able to dissipate. For example, a cooling system for a laptop processor may be designed for a 20 watt TDP. Therefore, it has been determined that the cooling system is able to dissipate 20 watts without exceeding the maximum junction temperature for transistors within the processor.

In one embodiment, a power model executed on a pre-silicon model of the die 102 may perform a power measurement. Later in a design cycle, power measurements may be performed on actual fabricated silicon dies during a testing phase and debugging phase. A peak power value for die 102 may be defined by functional failure of the die 102 executing a high power virus application on the core. A de-rated form of a high power virus application may be used to set the thermal design power (TDP) of the die 102. This de-rated code and its corresponding power consumption may be used to set the operational voltage and frequency of each computation unit 120 for binning purposes.

The power management unit 130 may associate a total number of power credits for die 102 to a given TDP value for die 102. The power management unit 130 may allocate a separate given number of power credits to each computation unit 120. A sum of the associated power credits equals the total number of power credits for die 102. The power management unit 130 may be configured to adjust the number of power credits for each of the computation units 120 over time. These adjustments may be based on a power profile conveyed from each of the computation units 120 to the power management unit 130.

For example, each of the computation units 120 may determine a corresponding power consumption number during each given time interval. Any of a variety of techniques may be utilized to determine power consumption of a given computation unit and will be discussed further below. In some embodiments, a given computation unit may utilize analog or digital thermal sensors placed throughout the portion of the die 102 corresponding to the given computation unit 120. The thermal sensors provide information as to when the die heats up in a particular area due to increased compute activity. However, these sensors respond to each change in thermals, whether it's driven by a compute-related boost in power consumption in the given computation unit 120 or by an external environmental factor, such as a rise in ambient temperature. Even when an amount of switching capacitance within the given computation unit has not changed over a time interval, the sensors may report higher thermal conditions due to a rise in ambient temperature. In addition, there is generally a time delay between a compute-related boost in power consumption and a temperature increase. Consequently, thermal sensors may not be an accurate gauge of power consumption.

In various embodiments, a given computation unit 120 may utilize current sensors. In some embodiments, such current sensors may measure an amount of current drawn by circuits within the unit, but may have a relatively large inaccuracy associated with readings. Also, these sensors may report a current usage for a set of multiple cores or logic blocks rather than for each individual component. Therefore, it may be difficult to know if any and which of the components has entered a compute-related boost in power consumption.

In other embodiments, the given computation unit may sample a number of pre-selected signals and determine a power usage value from the sampled signals. The selection of which signals to sample during a particular clock cycle may correspond to how well the selection correlates to the amount of switching node capacitance within the given computation unit 120. For example, in one embodiment, clock enable signals routed to local clock distribution blocks may be the signals chosen to be sampled and to provide reliable and accurate power usage values.

Sampled data points corresponding to the sampled signals may be taken during each given intermittent cycle. The determination of the number of intermittent cycles to use may depend on the desired accuracy and confidence of the sampled data. A spreadsheet, or a look-up table, may be generated using both statistical analysis and measurements of both the real power consumption of an application and estimated power consumption from a sampling. A confidence level and an error rate may be chosen to further develop the statistical analysis. An example of a real-time power estimation method includes application Ser. No. 12/101,598, filed Apr. 11, 2008, entitled "Sampling Chip Activity for Real Time Power Estimation", the entirety of which is incorporated herein by reference.

When a given computation unit 120 determines a corresponding power usage value, this value is conveyed to the power management unit 130. This value may be determined by any of the methods described above or any other available method. The power management unit 130 may have an ability to alter the number of power credits allotted to each of the computation units 120 in response to receiving the power usage values. In one embodiment, a value of a thermal credit may be expressed as a given unit of value determined during simulations and testing. For example, if die 102 comprises three computation units 120 and each produces a similar amount of thermal energy during high workloads, then each computation unit may be allotted ten thermal power credits.

In contrast to the above example, the three computation units may produce different thermal energy levels during high workloads. A first computation unit may produce three times the thermal energy produced by the third computation unit under high workloads. A second computation unit may produce two times the thermal energy produced by the third computation unit under high workloads. Therefore, the power management unit 130 may initially assign (or "allocate") 15 thermal power credits to the first computation unit, 10 thermal power credits to the second computation unit, and 5 thermal power credits to the third computation unit. Alternatively, the power management unit 130 may assign a separate TDP value to each computation unit, wherein when each of the computation units 120 concurrently operates at a corresponding assigned TDP value such that the thermal energy of the die 102 reaches, but does not exceed, its given overall TDP value.

When a given computation unit does not have a high or moderate workload, its activity level may decrease below a given threshold. Accordingly, its measured power usage value decreases. The resulting reduced power usage value is conveyed to the power management unit 130. In response to the reduced power usage value, the power management unit 130 may redistribute the power credits of the die 102. For example, the power management unit 130 may lend power credits of a determined inactive computation unit to a computation unit that is determined to be highly active. In one embodiment, the power management unit 130 may increase the TDP of a highly active computation unit causing it to maintain or even increase its high activity level. The extra thermal energy generated by this highly active computation unit may be dissipated across the bulk silicon of the die, across the metal on the back of the die, through a heat sink, and through the ambient environment being cooled by a system fan. The relatively inactive computation unit aids in the dissipation of the extra-generated thermal energy allowing the highly active computation unit to maintain high performance.

Taking cores within modern microprocessors as an example of a computation unit 120, these cores allow flexibility regarding its operational mode. The combination of the operational frequency and the operational voltage may be selected in real-time as the core processes a workload (instructions of a software application). A reason for this real-time adjustment is an attempt to maintain high performance while limiting power consumption, which is increasing for each generation of microprocessors. The power consumption of integrated circuits (ICs), such as modern complementary metal oxide semiconductor (CMOS) chips, is proportional to the expression $\alpha fCV^2$. The symbol $\alpha$ is the switching factor, or the probability a node will charge up or discharge during a clock cycle. The symbol f is the operational frequency of the chip. The symbol C is the equivalent capacitance, or the switching capacitance, to be charged or discharged in a clock cycle. The symbol V is the operational voltage of the chip. In an attempt to reduce the power consumption of the chip, and to reduce the electrostatic fields within the transistors, the power supply voltage V may be decreased during operation. However, there is a limit to the power supply voltage reduction. This reduction decreases the amount of current that may flow through a transistor and, thus, increases the propagation delays through transistors. If the threshold voltages are reduced in order to turn-on the transistors at an earlier time and aid in maintaining performance, then transistor leakage current increases. An increase in transistor leakage current both increases power consumption and the potential for logic failure.

In addition to adjusting the operational voltage in real-time to attempt to reduce power consumption, other factors in the power expression are considered. For example, the geometric dimensions of devices and metal routes on each generation of cores are decreasing. Superscalar designs increase the density of integrated circuits on a die with multiple pipelines, larger caches, and more complex logic. Therefore, the number of nodes that may switch per clock cycle significantly increases. Operational frequencies have been increasing with each generation too. The switching factor, $\alpha$, may decrease for certain blocks or units in the chip by disabling a clock signal to these areas during periods of non-use. Therefore, although the operational voltage and switching factor may be adjusted to decrease with each generation of ICs, the other terms in the IC power consumption expression are increasing and cause an overall increase in power consumption. Some solutions to this increase in power consumption include both micro architecture and circuit-level techniques.

The microarchitecture and circuit-level design techniques for balancing power consumption and performance are aided by efforts to estimate the power consumption in real-time. Some methods for estimating power consumption in real-time were described earlier. While running an application or applications, if the real-time power consumption of a core within a computation unit 120 is both known (or estimated) and conveyed to the power management unit 130, then in one embodiment, the power management unit 130 may select one discrete power-performance state (P-state) from several given discrete P-states. The selected P-state may be between a maximum performance state and a minimum power state. The maximum performance state includes a maximum operating frequency and the minimum power state includes a minimum operating frequency. The intermediate discrete power-performance states (P-states) include given scaled values for a combination of the operating frequency and the operational voltage. An illustration of transitioning between the P-states is provided below. It is noted that one or more of the computation units 120 may not measure an activity level or a power consumption estimate. Therefore, these computation units do not report a corresponding value to the power management unit 130. However, if two or more computation units both measure and report these values to the computation unit, then the power management unit be configured to transfer power between computation units on the die 102.

Figure 2:
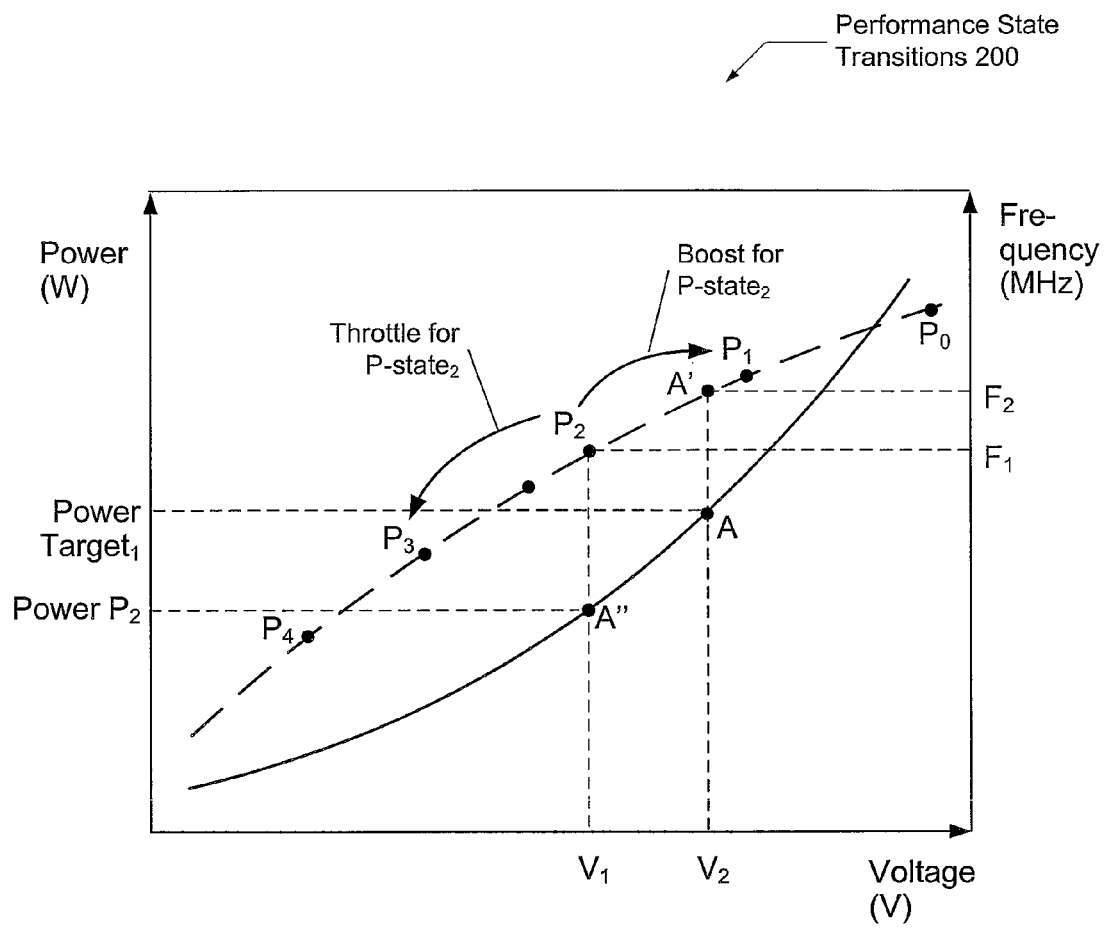
FIG. 2 is a generalized diagram of one embodiment of power-performance state transitions for a semiconductor chip.

Turning now to FIG. 2, one embodiment of power-performance state transitions 200 for a semiconductor chip is shown. Two curves are shown in the diagram showing non-linear (e.g., cubic or quadratic) relationships between power versus voltage and frequency versus voltage. Five discrete power-performance states (P-states) are shown in the diagram denoted as P0 to P4. A small number of discrete P-states are shown to simplify the diagram. Although only five discrete P-states are shown, it is well known another number of discrete P-states may be supported.

In the diagram shown, the P-state $P_4$ may correspond to a discrete state with a lowest performance of all the supported discrete states and comprises the lowest operational frequency. In addition, the P-state $P_4$ may correspond to a discrete state with a lowest power consumption of all the supported discrete states and comprises the lowest operational voltage. On the other hand, the P-state $P_0$ may correspond to a discrete state with a highest performance of all the supported discrete states and comprises the highest operational frequency. In addition, the P-state $P_0$ may correspond to a discrete state with a highest power consumption of all the supported discrete states and comprises the highest operational voltage. Typically, the endpoint discrete states represented by P-states $P_0$ and $P_4$ define a region of predictable performance. Therefore, configuring a processor to support multiple P-states, or operating points, along the non-linear frequency versus voltage curve may provide stable, optimal utilization of power and delivery of performance for the semiconductor chip, such as a processor. The management of the P-states may conform to an industry standard such as the Advanced Configuration and Power Interface (ACPI) standard, originally developed by Intel Corp., Microsoft Corp., and Toshiba Corp., but development also now includes Hewlett-Packard Corp. and Phoenix Corp. The standard was last published as Revision 4.0a on Apr. 5, 2010.

As shown in the diagram, a power $target_1$ may be chosen for the chip, wherein the power $target_1$ represents an initial value for the TDP of the chip. As described earlier, a thermal design power (TDP) may represent an amount of power that a cooling system is able to dissipate without exceeding the maximum junction temperature for transistors within the chip. The value power target in FIG. 2 may represent a currently assigned TDP value. As shown in FIG. 2, the power $target_1$ corresponds to a data point A on the power versus voltage non-linear curve. Data point A corresponds to an operating voltage $V_2$. Projecting data point A onto the non-linear frequency versus voltage curve with respect to the operating voltage $V_2$ provides data point A'. The data point A' corresponds to an operating frequency $F_2$. The operating point represented by the combination of the operating voltage $V_2$ and the operating frequency $F_2$ may provide an optimal utilization of power and delivery of performance for the chip.

As described above and shown in the diagram, an operating point for power $target_1$ is identified by data point A'. However, this operating point is not represented by a discrete P-state on the power versus frequency curve. The data point A' is located between the P-states $P_1$ and $P_2$. In order to reduce power consumption, the P-state $P_2$ may be chosen as an initial operating point for the corresponding chip. A corresponding combination of the operating voltage $V_1$ and the operating frequency $F_1$ may be the resulting chosen operating point.

A chip, such as a processor, may continue processing workloads utilizing an initially assigned P-state until either (i) the workload significantly changes which causes a significant change in a reported activity level, (ii) a power consumption tracking value reaches a given threshold, or (iii) the initial TDP value changes, which changes the power target value shown in the diagram. For example, if a processor is executing instructions for a workload that causes a consistent activity level over time, the accumulated effect of the workload may cause a power detection system within the processor to reach a given high threshold. This threshold may indicate the processor is generating significant heat and the power should be reduced. In one embodiment, a power manager, which may be located within the processor, may detect this condition and accordingly choose a different P-state corresponding to a lower power-performance operating point.

A "throttle" of a P-state includes decrementing the currently selected P-state by one P-state to a lower power consumption P-state. In contrast, a "boost" of a P-state includes incrementing the currently selected P-state by one P-state to a higher performance P-state. Throttling the P-state $P_2$ includes transitioning the currently selected P-state $P_2$ to the lower power-performance state $P_3$. A simple illustration of boosting and throttling a given P-state, such as the P-state $P_2$ as an example, is shown in FIG. 2. In some embodiments, each boost operation and each throttle operation may cause a currently selected P-state to transition by two or more P-states when the logic supports this added complexity. The P-state transitions may be controlled by logic within a processor, and thereby is a self-contained system. However, an external unit, such as the power management unit 130, may alter the TDP value for the processor, which changes the power target value in the diagram, based on power consumption feedback from each computation unit 120 on die 102.

Continuing with the transitions of P-states, after receiving power consumption estimates from the computation units 120, the power management unit 130 may convey parameters, such as a new TDP value, to the computation units 120. A new TDP value may correspond to a new number of allotted power credits. A computation unit that is relatively inactive may be allotted less power credits than its current value of allotted credits. Essentially, the relatively inactive computation unit is donating power credits. Conversely, a computation unit that is highly active may be allotted more power credits than its current value of allotted credits. Essentially, the highly active computation unit is receiving the donated power credits.

After receiving a new TDP value from the power management unit 130, each of the computation units 120 may accordingly select a new corresponding P-state. In one embodiment, the selection may include choosing any one of a given number of supported discrete P-states. In another embodiment, the selection may include determining whether to boost, throttle or maintain a currently selected P-state.

In one embodiment, a given computation unit may capture a measured activity level at the end of each given time interval. The measured activity level may correspond to values associated with given signals chosen to be sampled during the time interval. For example, in one embodiment, clock enable signals routed to local clock distribution blocks may be the signals chosen to be sampled. The selection of which signals to sample during a particular clock cycle may correspond to how well the selection correlates to the amount of switching node capacitance.

A multiple number of samples may be taken during the given time interval. The determination of the number of intermittent clock cycles to use before computing an activity level may depend on the desired accuracy and confidence of the sampled data. A spreadsheet, or a look-up table, may be generated using both statistical analysis and measurements of both the real power consumption of an application and estimated power consumption from a sampling. A confidence level and an error rate may be chosen to further develop the statistical analysis. An example of a real-time power estimation method includes application Ser. No. 12/101,598, filed Apr. 11, 2008, entitled "Sampling Chip Activity for Real Time Power Estimation".

In one embodiment, at the end of the given time interval, a given computation unit may compute a signed running accumulated difference between the measured activity level and the power target. Again, the power target may be a thermal design point (TDP). The accumulated difference may be calculated at the end of each given time interval as AccTdpDelta=AccTdpDelta+(TDP−RcvdActLevel+derated BrrwValue). Here, the variable AccTdpDelta is the signed running accumulated difference. The variable TDP is the assigned thermal design power, or an equivalent number of power credits. The variable RcvdActLevel is the activity level determined from the sampled signals in the function blocks of the computation unit. The variable de-rated BrrwValue is a de-rated value of the number of power credits the computation unit is allowed to borrow as determined by the power management unit. De-rating this number of power credits is based on at least the activity level of the computation unit borrowing power credits. This process is described in further detail later.

Alternatively, the power management unit may send a new TDP value to the computation unit rather than the value de-rated BrrwValue discussed above. The new TDP value may incorporate an initial TDP value for the computation unit and a de-rated value of a number of power credits to allow the computation unit to borrow. Therefore, the power management unit may send a value $TDP_{new}$ and the accumulated difference may be calculated at the end of each given time interval as AccTdpDelta=AccTdpDelta+($TDP_{new}$−RcvdActLevel). If the measured activity level represented by the variable RcvdActLevel is higher than the TDP (or $TDP_{new}$), then the accumulated value AccTdpDelta drifts toward a negative value. If the measured activity level is lower than the TDP, then the accumulated value AccTdpDelta drifts toward a positive value. When the accumulated value reaches a positive given threshold, the computation unit may decide to throttle the current P-state. When the accumulated value reaches a negative given threshold, the computation unit may decide to boost the current P-state.

Figure 3:
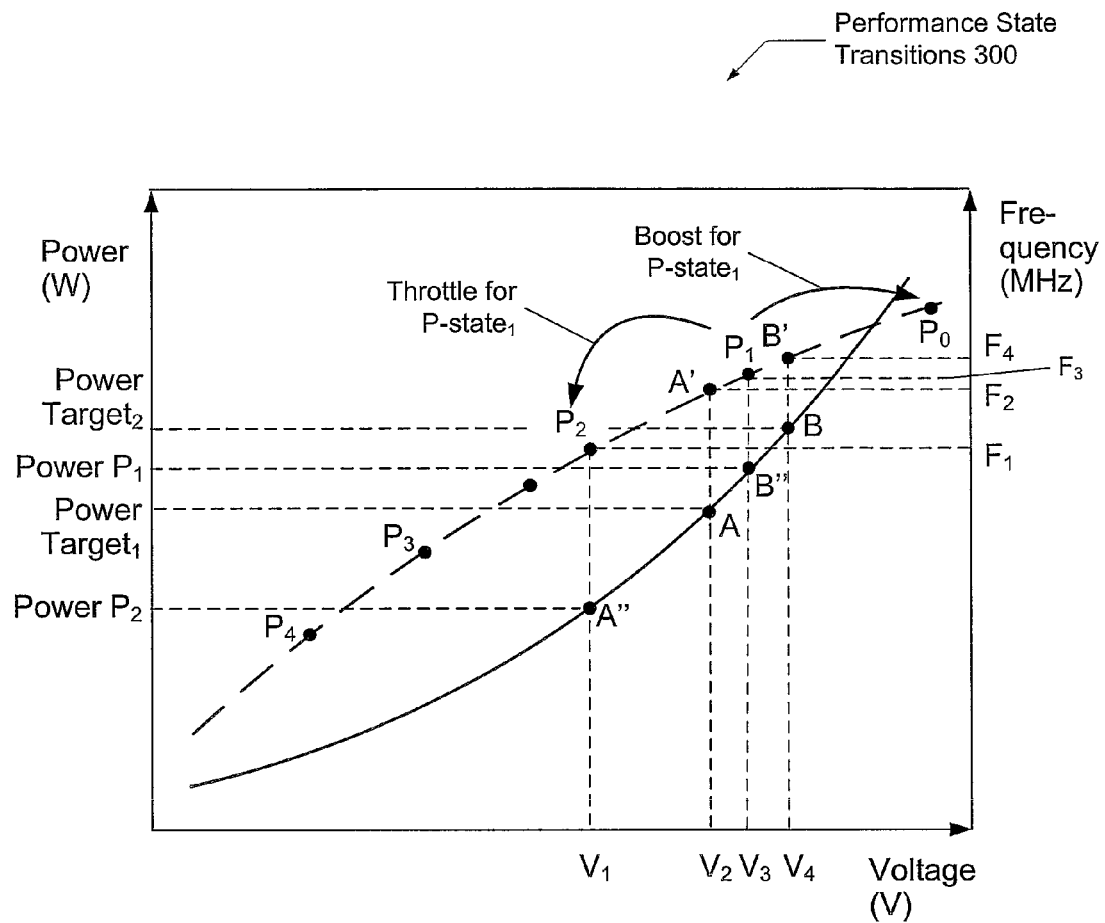
FIG. 3 is a generalized block diagram of another embodiment of power-performance state transitions for a semiconductor chip.

Referring now to FIG. 3, another embodiment of power-performance state transitions 300 for a semiconductor chip is shown. Similar to the diagram shown in FIG. 2, two non-linear curves illustrate relationships for a chip between power versus voltage and frequency versus voltage. The same five discrete power-performance states (P-states) are shown in the diagram and they are denoted as P0 to P4. Continuing with the example above regarding FIG. 2, the power management unit 130 may determine to change a TDP value for one or more computation units based on power consumption estimates from each of the computation units 120 on die 102. For example, the current TDP value may be increased to a higher TDP value for a given computation unit, wherein the given unit is receiving donated power credits being donated from a different inactive computation unit. The increase in TDP is shown as new power target$_2$ having a higher value than the current power target$_1$.

As shown in FIG. 3, the power target$_2$ corresponds to a data point B on the power versus voltage non-linear curve. Data point B corresponds to an operating voltage $V_4$. Projecting data point B onto the non-linear frequency versus voltage curve with respect to the operating voltage $V_4$ provides data point B'. The data point B' corresponds to an operating frequency $F_4$. The operating point represented by the combination of the operating voltage $V_4$ and the operating frequency $F_4$ may provide an optimal utilization of power and delivery of performance for the chip.

The operating point represented by the combination of the operating voltage $V_4$ and the operating frequency $F_4$ may not be supported by a discrete P-state on the power versus frequency curve. The data point B' is located between the P-states $P_0$ and $P_1$. In order to reduce power consumption, the P-state $P_1$ may be chosen as a new operating point for the corresponding chip. A corresponding combination of the operating voltage $V_3$ and the operating frequency $F_3$ may be the resulting chosen operating point.

It is noted certain criteria may be used to determine the value of power target$_2$ in addition to the activity levels of the computation units. For example, a voltage regulator is able to supply a peak current, which is larger than a thermal design current (TDC). However, the TDC is the amount of current supplied for given normal to high operating conditions. The design constraint for the TDC value may also minimize platform costs. When donating power credits to a given computation unit and increasing a power target$_1$ to a power target$_2$ without prior checks, the value for the TDC may be insufficient to support the increased activity for the given computation unit. Although on-chip performance may increase by allowing power transfer between computation units, the cost of modifying the voltage regulator to support a higher TDC is significant. Therefore, prior to allotting new TDP values (either directly or via a number of power credits) to the computation units 120, the power management unit 130 may perform checks. These checks may determine no computation unit will withdraw more current than an amount represented by a corresponding TDC of a respective voltage regulator. Other checks for design constraints that may be taxed by an increased TDP value are possible and contemplated.

It is noted a similar discussion as the above exists for a computation unit that donates power credits. In such a case, the new TDP value assigned by the power management unit, which may be represented as power target$_3$, (not shown) has a lower value than power target$_1$. The steps to find a resulting operating point would follow the steps described above. The process described above may repeat after the power management unit 130 again receives new power consumption estimates from the computation units 120 at given time intervals and determines new TDP values. When determining new TDP values and/or corresponding power credits, the power management unit may base a final value assigned to a given receiving computation unit on the activity levels of each computation unit.

Referring now to FIG. 4, one embodiment of a power borrowing de-rating table 400 is shown. A computation unit may report an activity level to a power management unit. Alternatively, a computation unit may report a power consumption estimate measured in watts or an internal unit of measurement, a temperature measurement, a current drawn measurement, and so forth. Each choice includes trade-offs in cost and reporting accuracy that designers may contemplate during the design of the die 102. For this discussion, an activity level is used to describe selecting a power borrowing value, although other measurements are possible and contemplated.

In one column of table 400, ranges of activity levels are stored. A reported activity level from a given computation unit may be used to index the table and select a row within the table. In the embodiment shown, the received activity level is compared to three thresholds. Although three thresholds are shown in the table 400, a choice of more or less thresholds is possible and contemplated. A second column in table 400 stores values of a given power borrowing value. The power borrowing values are based on the comparisons of the reported activity level and the thresholds. The given power borrowing value may be expressed as power credits, a number of watts related to a TDP value, or otherwise.

The power borrowing value may be based on both a TDP value and an activity level of a donating computation unit determined to be relatively inactive. In one embodiment, a computation unit may make available for donation a given power borrowing value based upon a currently unused amount of power the computation unit may be otherwise entitled to use or potentially use. The power consumption of given computation unit may be reported or estimated as discussed above. Alternatively, a table similar to that of table 400 may be used to determine a de-rated power value to donate from a computation unit based on comparisons of a receiving unit's activity level compared to two or more thresholds.

Further, the power management unit 130 may have one large table with corresponding columns for each computation unit on the die 102. This large table may be configured to track reported activity levels of each computation unit, compare the reported activity levels to corresponding thresholds, determine which computation units are able to donate power credits, determine an amount of power credits that each qualified donating computation unit is able to donate, determine which computation units are able to receive power credits, and determine an amount of power credits that each qualified receiving computation unit is able to receive. The complexity and granularity of detail for a table may be determined by design trade-offs such as at least a total time allotted for the determinations and on-die real estate for storing the information and for the combinatorial logic. It is noted the amount of power credits that each qualified receiving computation unit is able to receive may depend on both a thermal limit and an electrical limit. For example, a rated thermal design point (TDP) as described earlier may set the thermal limit. A rated thermal design current (TDC) of a corresponding voltage regulator as described earlier may set the electrical limit. Again, prior to allotting new TDP values (either directly or via a number of power credits) to the computation units 120, the power management unit 130 may perform checks. These checks may determine a computation unit receiving power credits will not draw more current than an amount represented by a corresponding TDC of a respective voltage regulator. Other checks for design constraints that may be taxed by an increased TDP value are possible and contemplated. These checks may set the values stored in table 400.

Figure 5:
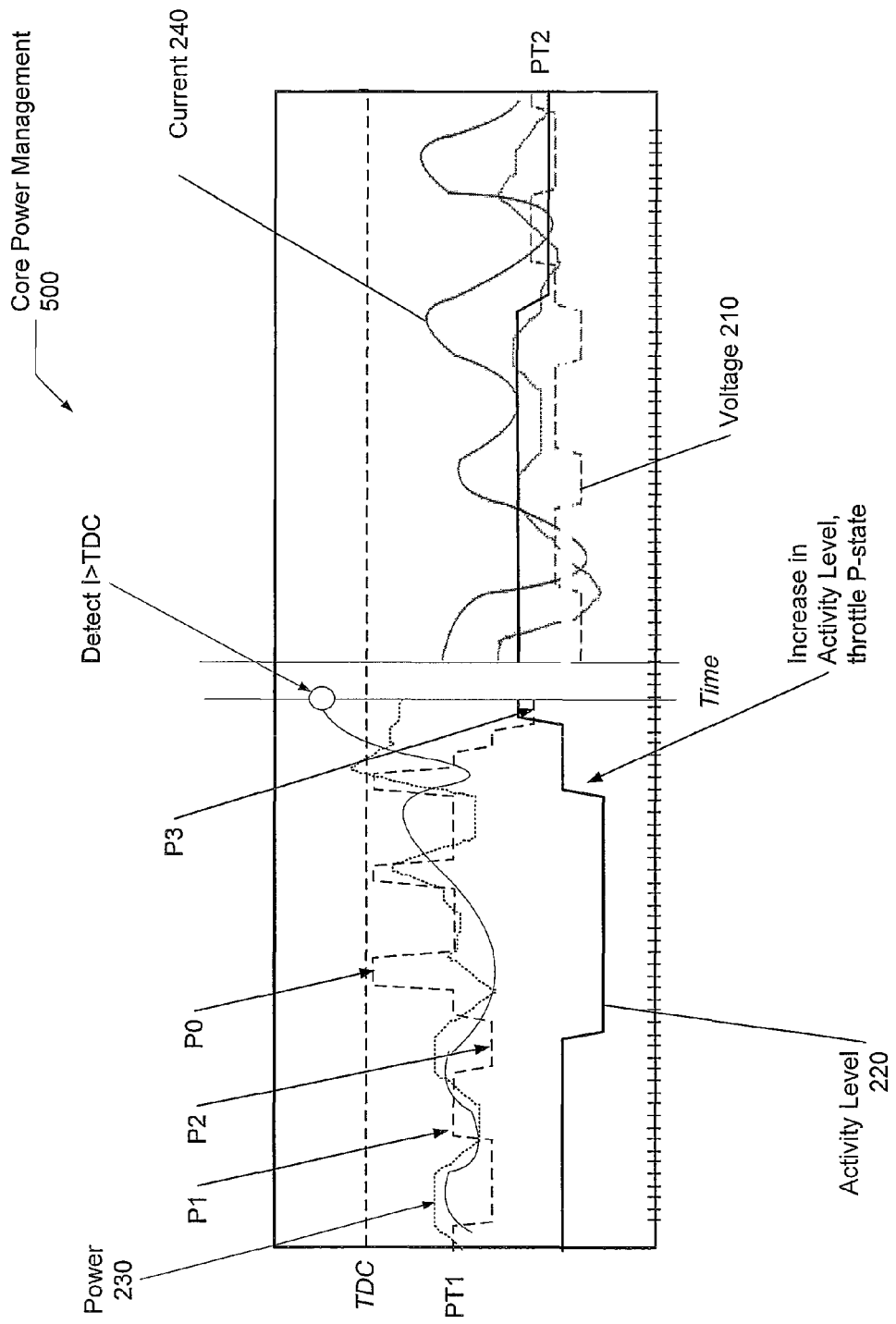
FIG. 5 is a generalized block diagram of one embodiment of electrical characteristics corresponding to a power management system.

Turning now to FIG. 5, one embodiment of measured electrical characteristics 500 corresponding to a power management system is shown. It is noted that the depicted values are not intended to be precise. Rather, the chart in FIG. 5 is provided for purposes of discussion to (generally) show relative relationships between the various values depicted. In the example shown, changes to an operational voltage 210 and a measured activity level 220 over time are depicted. In addition, power 230 is shown over time. As shown in FIG. 5, there may be P-state transitions both when an activity level experiences a significant change and when the activity level is constant. In the diagram, the P-state transitions correlate with changes in the operating voltage 210. Some P-state values are labeled in the diagram. For example, with a constant activity level 220, a P-state P1 transitions to P-state P2, which has a lower operating voltage as shown in the diagram. The power 230 may, for example, be adjusted by the P-state transitions in order to track a first power target (PT1). In one embodiment, the chip may utilize P-state dithering to maintain a virtual operating point corresponding to the power target. Dithering is a method whereby a chip may alternate between higher and lower discrete P-states in order to achieve an average that corresponds to an intermediate value between the higher and lower discrete P-states. Methods and mechanisms for performing dithering are further described in application Ser. No. 12/819,777, filed Jun. 21, 2010 the entirety of which is incorporated herein by reference.

In FIG. 5, the current 240 drawn by the chip over time is shown. The current 240 increases as the operational voltage decreases for a same power consumption value (I=P/V). This same power consumption value may be an average value obtained by toggling between P-states over time. The P-state dithering may be used to maintain a ratio close to unity between an average power consumed on the chip and a power target, such as the PT1 value. In one embodiment, a thermal design point (TDP) value may be chosen for the PT1 value. By maintaining such a ratio close to unity, the chip may seek to maximize performance while still consuming a desired amount of power (e.g., an amount of power dissipated by a corresponding cooling system). However, even if P-state dithering is not occurring (e.g., during a steady state boost), workload changes may lead to an excessive amount of current drawn as described below.

A power transfer from a first on-die component to a second on-die component may transfer a number of available power credits in order to provide a maximum (or increased) overall chip performance. In some embodiments, the first on-die component may utilize a first voltage plane, and thus, a first voltage regulator. The second on-die component may utilize a separate second voltage plane, and thus, a separate second voltage regulator. Referring again to FIG. 3, a maximum number of power credits may correspond to a maximum new power target value. Accordingly, the operating point of the receiving second component may increase as shown in FIG. 3, wherein point B' is a higher performance operating point than point A'. The average operating voltage of a new higher operating point is a function of both the power transferred and the workload of the receiving second component.

Generally speaking, the amount of power credits transferred to a given receiving component may be found by indexing the de-rating table 400 with the current activity level of the receiving component. At least a thermal limit and an electrical limit for the receiving component may be used to derive the de-rating table entry values. For example, a given receiving component may be operating at a P-state P4 as shown in FIG. 3. The operating voltage is low for P-state P4. The P-state P4 may have been chosen for the receiving component due to a high activity level. Accordingly, the amount of current drawn by the receiving component is high (I=P/V) and may be close to a corresponding TDC limit. Therefore, when the high activity level of the receiving component is used to index the de-rating table 400, the maximum power borrowing value may be de-rated (divide by 4, divide by 2, set to 0). When the receiving component receives the de-rated value of power credits, the power consumption may increase, the operating voltage may increase, and the amount of current drawn may increase. However, these increases are limited by the de-rating of the number of power credits received. Therefore, the receiving component may not exceed the corresponding TDC limit, since the maximum number of power credits was not transferred. The de-rating of the number of power credits may be used to safeguard against possibly exceeding the corresponding TDC limit.

Referring again to FIG. 5, while the second component operates at a higher operating point after a power transfer as described above, the workload for the second component may maintain its current activity level for a time period. For example, as shown in FIG. 5, the second component may be operating at an operating point denoted by PT1. The operating point PT1 may be a new higher operating point after a prior power transfer (not shown). The second component may be dithering between discrete supported P-states during this time period as shown in FIG. 5. The operating voltage is shown to transition while the dithering occurs. Some P-state values that are reached during the dithering are marked, such as P1, P2, P0 and P3.

During operation of the second component, the instructions of executing software applications may change the types of operations for the second component to execute, may change a number of operations of a particular type for the second component to execute, may change a total number of operations for the second component to execute, or may perform a combination of the changes. Therefore, the workload for the second component may change over time independent of the transfer of power credits, but based on the executing software applications. As shown in FIG. 5, the activity level begins at a first level and maintains the first level for a first time period. Afterward, the activity level steps down to a new level and maintains the new lower level for a second time period. Following, the activity level steps up to new increased levels. The increased workload, rather than the decreased workload, may cause design issues as further described next.

Continuing with a description of an increased workload for the second component resulting from changes within the executing software applications, the current 240 drawn by the chip may increase. The increase in the current 240 drawn by the chip may be due to both the higher activity level and more switching capacitance associated with the higher workload. The higher drawn current 240 by the second component may violate a thermal design current (TDC) limit of a corresponding voltage regulator. Typically, the amount of current 240 drawn by the chip does not reach the TDC limit. However, now the second component is operating at a P-state associated with an older and smaller workload prior to the workload increase. The chip may further attempt to maintain a same average power-performance level. As the workload increases, the amount of current 240 drawn by the chip increases, and the power consumption increases. Therefore, the chip throttles the P-state to decrease the operational frequency and the operational voltage. As shown in FIG. 5, the operating voltage steps down due to P-state throttling as the activity level steps up.

As noted above, the current 240 drawn by the chip may exceed a given limit. The chip may be operating at a higher performance P-state due to receiving donated power credits from another on-die chip or component. When the chip is operating at higher performance P-state, the power consumption and the amount of current drawn increases. The de-rating table 400 may be used to limit the number of power credits transferred. Therefore, the amount of increase in both the power consumption and the amount of current drawn may be safely guarded. Later, the activity level may increase significantly due to new demands by applications. A subsequent drop in the operational voltage while maintaining relatively stable power consumptions may cause the current 240 drawn by the chip to surpass a limit. The current 240 drawn by the chip surpasses a limit as shown in FIG. 5. In one embodiment, the current limit may be a thermal design current (TDC) for a corresponding voltage regulator. The operational voltage may decrease during the throttling of a P-state as shown in FIG. 2, FIG. 3 and FIG. 5.

As seen in FIG. 5, although transferring power credits may yield an overall performance boost for a chip, monitoring particular conditions may be performed to avoid exceeding design constraints. For example, after a given component receives power credits, at a later time, the workload may change due to changes caused by software applications. An increased workload may cause two terms ($\alpha$, C) in the power consumption expression for the given component to increase. As is well known, the power consumption of integrated circuits is proportional to $\alpha fCV^2$, wherein $\alpha$ represents a switching factor, f represents frequency, C represents capacitance, and V represents voltage. Generally speaking, a higher workload causes the switching factor $\alpha$ and the capacitance C to increase. Accordingly, the given component may begin P-state throttling in response to the increased power consumption. Generally, should power consumption increase beyond a given threshold, the P-state may be throttled in order to maintain a relatively stable power consumption value. P-state throttling may in turn be associated with a decrease in the operational frequency f and the operational voltage V.

Continuing with the above example of the given component receiving power credits, the P-state throttling may cause the two terms (f, V) in the above power consumption expression for the given component to decrease. Now, the current 240 drawn by the given component increases due to both (i) the increases in the switching factor $\alpha$ and the equivalent capacitance C and (ii) the decrease in operational voltage (I=P/V). The increase in the amount of current 240 drawn by the chip may exceed the TDC limit. This scenario is illustrated in FIG. 5. Therefore, in order to avoid violating the TDC limit, this condition may be monitored and detected. When this condition is detected, a subsequent modulation of the power transfer may occur.

In one example, in response to detecting a violation of the TDC limit, a portion of the donated power credits may be returned from the second component to the donating first component. Referring again to FIG. 3, in one embodiment, a return of a portion of donated power credits may result in a third power target, a power target$_3$ (not shown), that is located between power target$_1$ and a power target$_2$ in the diagram. During a determination of a number of power credits to donate from the first component to the second component, a maximum number of available power credits allowed may be used. However, later monitoring may show a subsequent return of a portion or all of the donated power credits may occur when a high power workload on the receiving second component causes an average of the drawn current 240 to exceed a limit, such as a corresponding TDC limit. The subsequent return of the portion or all of the donated power credits may be illustrated by the new and lower second power target (PT2). As shown in FIG. 5, the amount of current 240 drawn by the chip does not exceed the TDC limit after return of a portion or all of the donated power credits.

Figure 6:
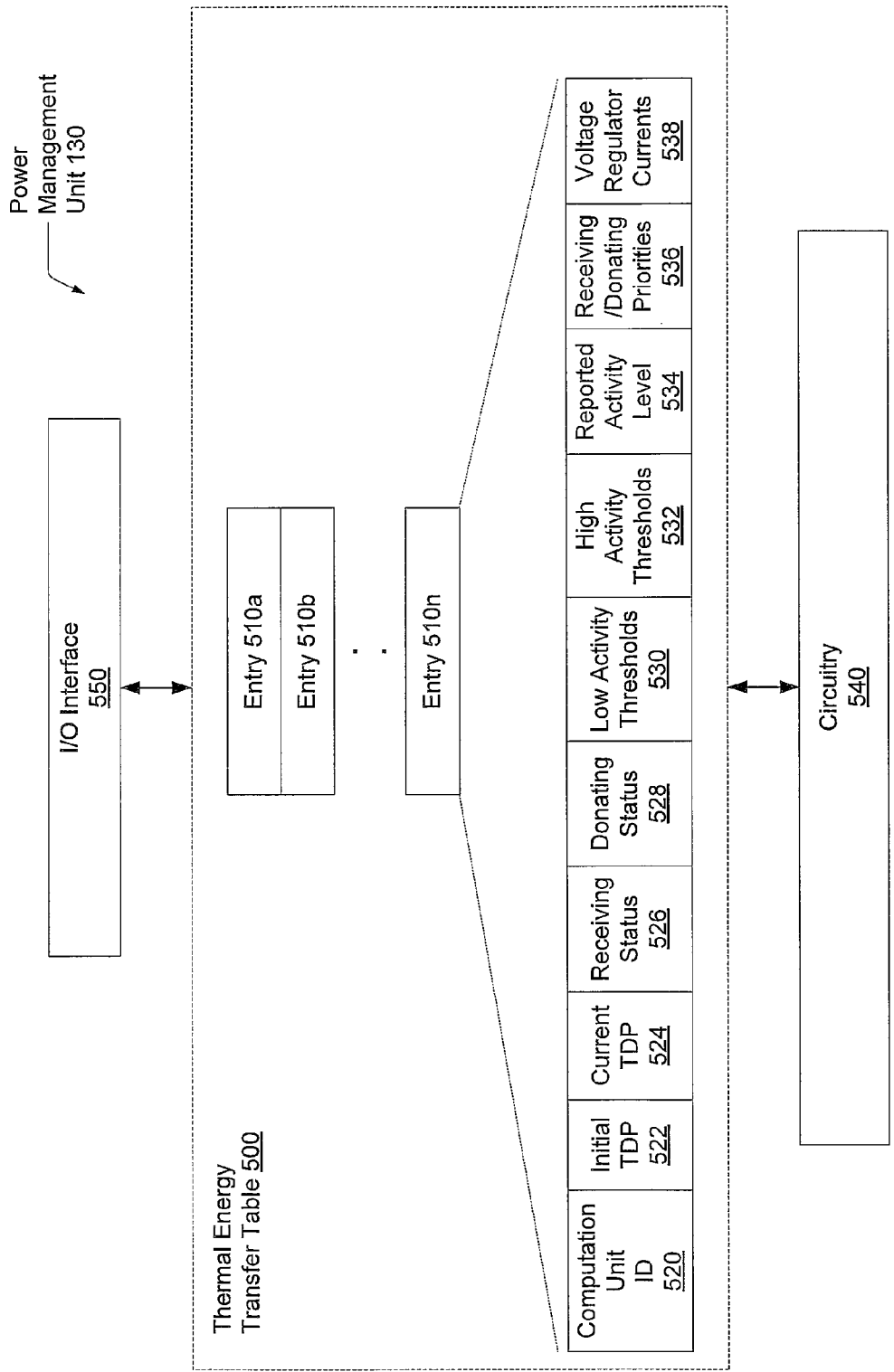
FIG. 6 is a generalized block diagram of one embodiment of a power management unit.

Referring now to FIG. 6, one embodiment of a power management unit 130 is shown. An input/output (I/O) interface 550 may communicate with each computation unit 120 on die 102. When new activity levels are reported, entries 510 within the power transfer table 500 maybe updated. Table 500 may comprise a separate entry 510 for each of the computation units 120 on die 102. Each entry 510 may comprise several fields as shown in FIG. 5. A computation unit identifier (ID) field 520 may identify which of the computation units 120 on the die 102 corresponds to a particular entry 510. An initial TDP value field 522 may store a corresponding TDP value rated for a respective computation unit. A current TDP value field 524 may store a current TDP value for the respective computation unit. The current TDP value stored in field 524 may differ from the initial TDP value stored in field 522 due to power transfers on the die. Alternatively, table 500 may store corresponding values representative of power credits in fields 522 and 524.

The fields 526 and 528 in table 500 may store indications of whether a corresponding computation unit is receiving power credits or donating power credits. In addition, these fields may store a number of corresponding power credits that are received or donated. Fields 530 and 532 in table 500 may store one or more threshold values corresponding to low and high usage, respectively. These threshold values may be compared to a reported activity level value, which may be stored in field 534 in table 500. The activity level may be reported to the power management unit 130 every given time interval.

The field 536 in table 500 may store priority values for receiving and donating power credits. For example, a first computation unit is detected to be able to donate 3 power credits. A second and a third computation unit each may be able to receive 2 power credits. A priority scheme may be used to determine whether the second computation unit or the third computation unit receives only a single thermal credit. A similar priority scheme may be used to determine how each of a multiple number of computation units may donate power credits. The field 538 in table 500 may store TDC limits for each on-die voltage regulator. The stored TDC values may be compared to estimates of currents being drawn from each voltage regulator. In one embodiment, on-die current sensors or sensors within each voltage regulator may provide the estimates of drawn currents to the power management unit 130. In another embodiment, each on-die computation unit may provide the estimates of drawn currents. When any measured estimate exceeds a corresponding stored TDC limit, the power management unit 130 may adjust an allocation of power credits to on-die computation units. The reallocation of power credits may reduce a current consumption of a violating computation unit. For example, the computation unit may have received donated power credits. At a later time, a higher power workload may be run on the computation unit causing an average drawn current to exceed a corresponding TDC limit. When the power management unit 130 detects the exceeding condition, a portion or all of the donated power credits may be returned to a donating computation unit.

Although the fields 520-538 are shown in this particular order, other combinations are possible and other or additional fields may be utilized as well. The bits storing information for the fields 520-538 may or may not be contiguous. The circuitry 540 may comprise logic to perform comparison operations such as comparing reported activity levels to corresponding threshold values. In addition, the circuitry 540 may determine thermal credit amounts for donating and determine how to distribute the available power credits. Also, the circuitry 540 may monitor the status of each computation unit and determine when a donating computation unit should have power credits returned and which one or ones of the receiving computation units are selected to return the power credits.

Figure 7:
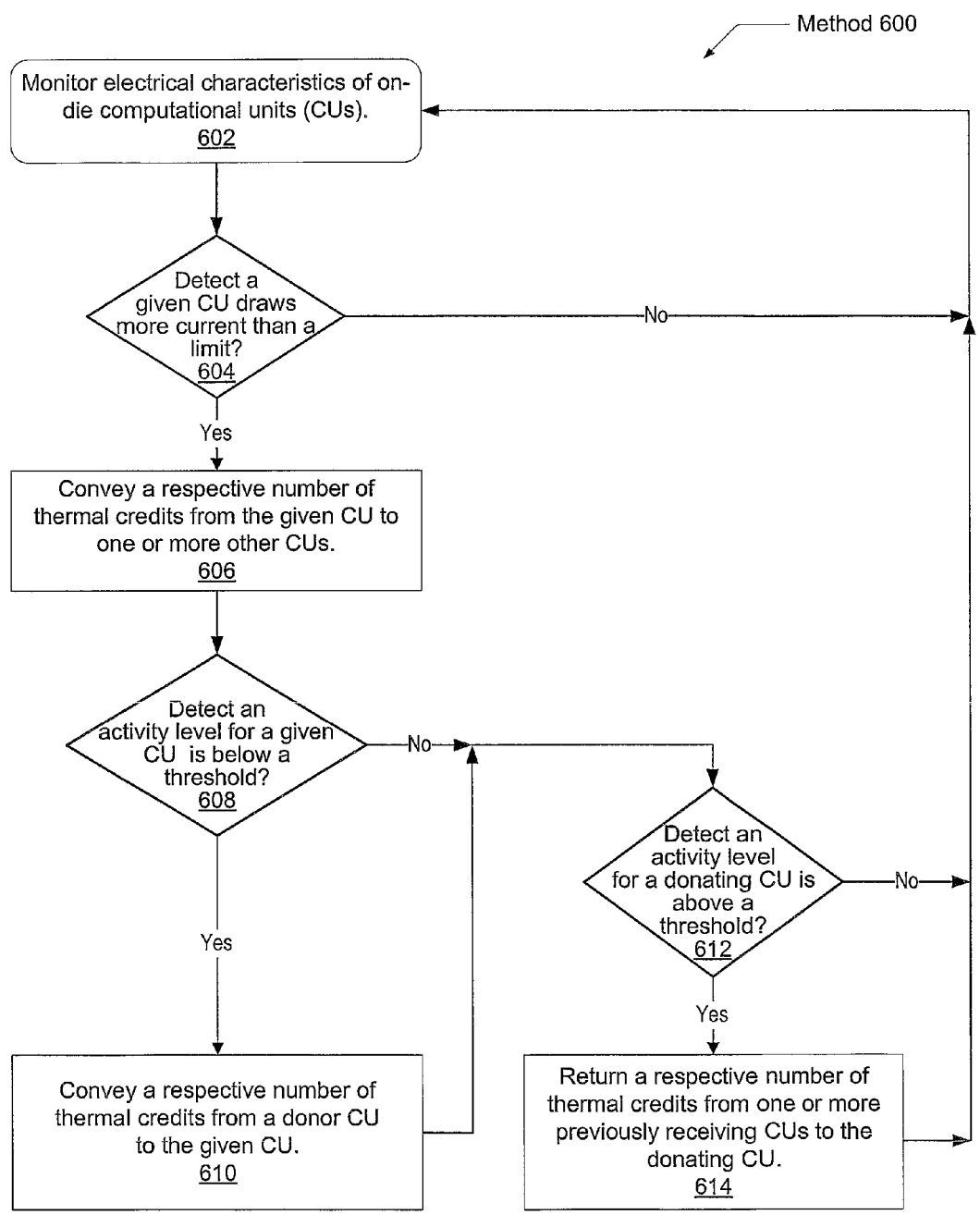
FIG. 7 is a flow diagram of one embodiment of a method for efficient power transfer on a die.

Turning now to FIG. 7, one embodiment of a method 600 for efficient power transfer on a die is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 602, one or more software applications are being executed on a die comprising one or more computation units. In one embodiment, a power management unit monitors the electrical characteristics of the on-die computation units. For example, an activity level, an amount of current drawn, and so forth may be reported to the power management unit. These values may be compared to corresponding stored values in a table, such as table 500 shown in FIG. 6. Each computation unit may measure a respective activity level. These activity levels may be reported to a controlling unit, such as the power management unit. In addition, each computation unit may measure or estimate an amount of current drawn from a corresponding voltage regulator. Alternatively, an external current sensor may measure the amount of current drawn. The value of the amount of current drawn for each computation unit may be conveyed to the power management unit for later comparisons.

Referring again to FIG. 5, an average of the current 240 drawn by a given computation unit may exceed a TDC limit when the computation unit (i) receives power credits that change a corresponding P-state to a higher performance P-state and/or (ii) the computation unit later receives a higher power workload. If the power management unit detects one or more computation units draw a current greater than a corresponding limit, such as a TDC limit (conditional block 604), then in block 606, the power management unit may return a respective number of power credits from each of the violating computation units to one or more previous donating computation units. Again, a table, such as table 500 shown in FIG. 6, may be used to determine the amounts of power credits to transfer. Alternatively, the power management unit may include logic that determines the power credits removed from the violating computation units may be conveyed to other qualifying active computation units other than the previous donating computation units that may still be inactive. For example, the other qualifying computation units may be operating on workloads, whereas the donating computation units may be still idle. The power management unit 130 may utilize the table 500 and the circuitry 540 to manage the record keeping of the allocation of the power credits across the computation units on the die.

If the power management unit detects a (receiving) computation unit on the die has an activity level below a given threshold (conditional block 608), then in block 610 the power management unit conveys a respective number of power credits from a donating computation unit to the receiving computation unit. Determining an amount of power credits to donate may include utilizing tables as described earlier. For example, a table such as table 500 shown in FIG. 6 may be used.

If the die has reassigned power credits and the power management unit detects a donating computation unit substantially increases its activity level (conditional block 612) or otherwise requires additional power, then in block 614, the power management unit may reallocate the power credits across the on-die computation units. The power management unit may monitor the donating computation units, such as through a table, to determine whether a respective activity level of a donating computation unit, which was previously below a respective threshold, is now above the threshold. If the respective activity level has risen above the threshold, then the power management unit may convey a respective number of power credits from each of the previously receiving computation units to the previous donating computation unit. A table may be used to determine the amounts of power credits to transfer.

Figure 8:
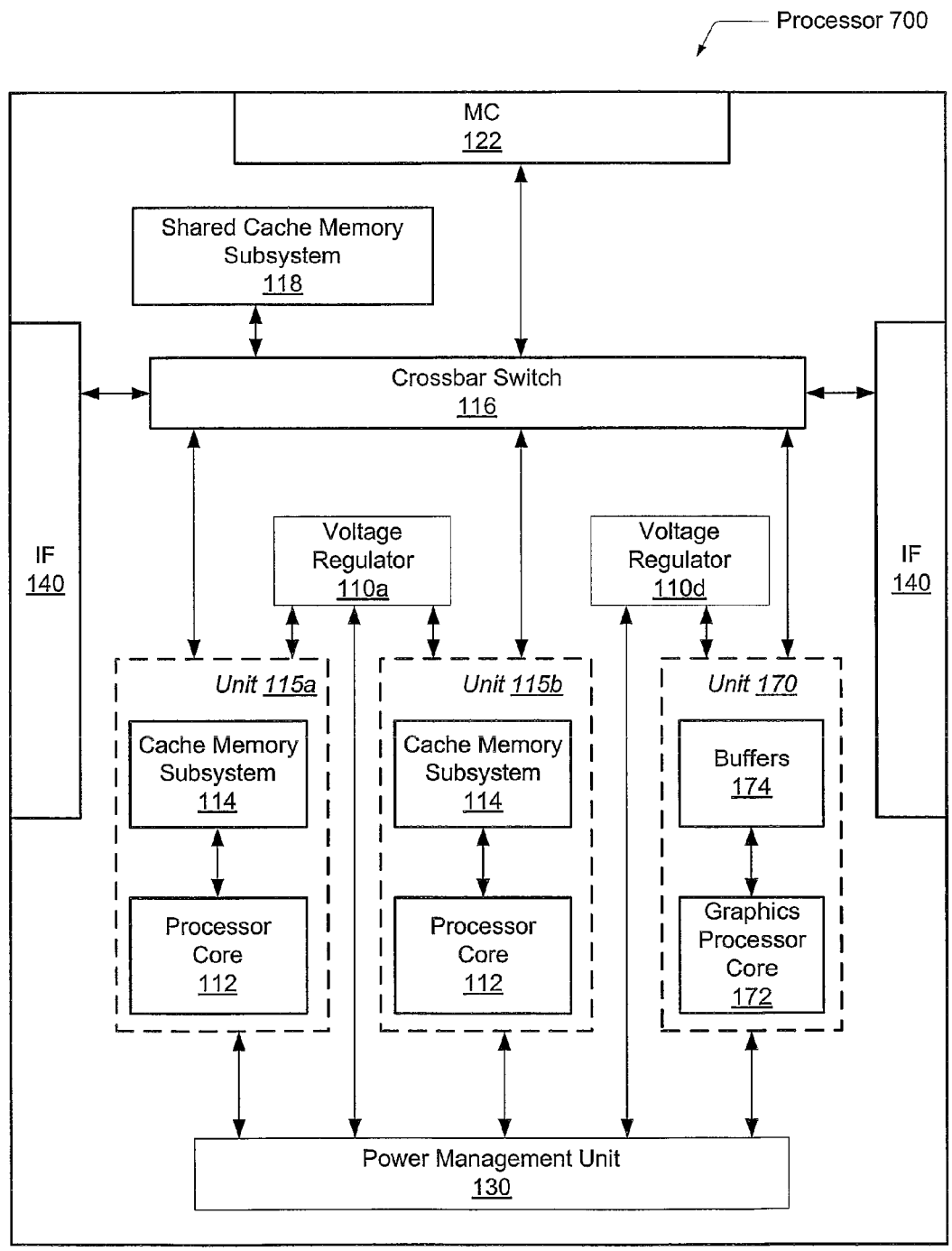
FIG. 8 is a generalized block diagram of one embodiment of a processor with on-die power management.

Referring now to FIG. 8, one embodiment of an exemplary processor 700 is shown. Processor 700 may include memory controller 122, interface logic 140, one or more processing units 115, which may include one or more processor cores 112 and a corresponding cache memory subsystems 114; packet processing logic 116, and a shared cache memory subsystem 118. In addition, processor 700 may include one or more graphics processing units (GPUs) 170. The GPU 170 may comprise a processor core 172 with a parallel architecture, such as a single instruction multiple data (SIMD) core. Examples of SIMD cores include graphics processing units (GPUs), digital signal processing (DSP) cores, and so forth.

In one embodiment, the GPU 170 may include one or more graphic processor cores 172 and data storage buffers 174. A GPU may be a dedicated graphics-rendering device for a personal computer, a workstation, or a video game console. In one embodiment, the illustrated functionality of processor 700 is incorporated upon a single integrated circuit on a single die.

Processor cores 112 include circuitry for executing instructions according to a predefined instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller within the node to which the missing block is mapped.

Modern GPUs 170 are very efficient at manipulating and displaying computer graphics, and their highly parallel structure makes them more effective than general-purpose central processing units (CPUs), such as processing unit 115, for a range of complex algorithms. A GPU typically executes calculations required for graphics and video and the CPU executes calculations for many more system processes than graphics alone. Conventional GPUs 170 use very wide single instruction multiple data (SIMD) architectures to achieve high throughput in image-rendering applications. Such applications generally entail executing the same programs, such as vertex shaders or pixel shaders, on large numbers of objects (vertices or pixels). Since each object is processed independently of other objects, but the same sequence of operations is used, a SIMD architecture provides considerable performance enhancement.

In one embodiment, the CPUs 115 and the GPU 170 may be proprietary cores from different design centers. Also, the GPU 170 may now be able to directly access both local memories 114 and 118 and main memory via memory controller 122, rather than perform memory accesses off-chip via interface 140. This embodiment may lower latency for memory accesses for the GPU 170, which may translate into higher performance.

Continuing with the components of processor 700, cache subsystems 114 and 118 may comprise high-speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches that are located nearer processor cores 112 (within the hierarchy) may be integrated into processor cores 112, if desired. In one embodiment, cache memory subsystems 114 each represent L2 cache structures, and shared cache subsystem 118 represents an L3 cache structure. Both the cache memory subsystem 114 and the shared cache memory subsystem 118 may include a cache memory coupled to a corresponding cache controller.

Generally, packet processing logic 116 is configured to respond to control packets received on the links to which processing node 110 is coupled, to generate control packets in response to processor cores 112 and/or cache memory subsystems 114, to generate probe commands and response packets in response to transactions selected by memory controller 120 for service, and to route packets for which node 110 is an intermediate node to other nodes through interface logic 140. Interface logic 140 may include logic to receive packets and synchronize the packets to an internal clock used by packet processing logic 116.

As shown in FIG. 8, the CPUs 115 share a same voltage regulator 110*a*. Alternatively, one or more CPUs 115 may be coupled to a separate voltage regulator. The GPU 170 is coupled to a separate voltage regulator 110*d* from the CPUs 115. Each of the cores 112 within each CPU 115 and each of the cores 172 within GPU 170 may monitor and measure a corresponding activity level. Each CPU 115 and GPU 170 may aggregate the respective activity levels and report a result to the power management unit 130. This reporting may occur at the end of each given time interval. The power management unit 130 may determine to transfer power between the CPUs 115 and GPU 170 using the methods described earlier.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LP-DDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A microprocessor comprising:
   at least a first computation unit (CU) and a second CU, each assigned a respective initial number of power credits; and
   a power manager;
   wherein each of the first CU and the second CU is configured to alternate between at least two discrete power-performance states (P-states) to maintain a virtual P-state corresponding to an average power, wherein the average power is a power target based upon a respective current number of power credits; and wherein in response to detecting an amount of current drawn by the first CU exceeds a given current limit, the power manager is configured to reduce a number of power credits currently allocated to the first CU.

2. The microprocessor as recited in claim 1, wherein the number of power credits currently allocated to the first CU exceeds an initial number of power credits allocated to the first CU by a given number of power credits, the given number of power credits having been borrowed from the second CU.

3. The microprocessor as recited in claim 1, wherein the given current limit is a thermal design current (TDC) value for the voltage regulator utilized by the first CU, wherein the first CU utilizes a first voltage plane and the second CU utilizes a second voltage plane different from the first voltage plane.

4. The microprocessor as recited in claim 2, wherein the power manager is configured to return the given number of power credits to the second CU in order to reduce number of power credits currently allocated to the first CU.

5. The microprocessor as recited in claim 1, wherein the first CU is configured to:
operate in a higher virtual power performance state (P-state) corresponding to a higher average power and a higher power target with power credits borrowed from the second CU than without power credits borrowed from the second CU; and
maintain the higher virtual P-state despite a changing workload by alternating between at least two different discrete P-states.

6. The microprocessor as recited in claim 1, wherein the number of power credits currently allocated to the first CU exceeds an initial number of power credits allocated to the first CU by a number of power credits borrowed from the second CU, and wherein in response to detecting the amount of current drawn by the first CU exceeds said limit, the power manager is configured to return fewer than all power credits borrowed from the second CU to the second CU.

7. The microprocessor as recited in claim 4, wherein in response to detecting an activity level of the second CU is below a given threshold, the power manager is further configured to:
determine a number of power credits to donate to the first CU based at least in part on an activity level of the first CU; and
borrow from the second CU the respective number of power credits for use by the first CU.

8. The microprocessor as recited in claim 7, wherein in response to detecting an activity level of the second CU has risen above a given threshold, the power manager is further configured to:
determine a number of power credits for the first CU to return to the second CU based at least in part on the activity level of the second CU; and
cause the first CU to return previously borrowed power credits to the second CU.

9. A method for efficient power transfer on a die, the method comprising:
measuring an activity level of at least one of a first computation unit (CU) and a second CU, each assigned a respective initial number of power credits;
alternating between at least two discrete power-performance states (P-states) in each of the first CU and the second CU to maintain a respective virtual P-state corresponding to an average power, wherein the average power is a power target based upon a respective current number of power credits; and
reducing a number of power credits currently allocated to the first CU, in response to detecting an amount of current drawn by the first CU of given exceeds a given current limit.

10. The method as recited in claim 9, wherein the number of power credits currently allocated to the first CU exceeds an initial number of power credits allocated to the first CU by a given number of power credits, the given number of power credits having been borrowed from the second CU.

11. The method as recited in claim 9, wherein the given current limit is a thermal design current (TDC) value for a voltage regulator utilized by the first CU, wherein the first CU utilizes a first voltage plane and the second CU utilizes a second voltage plane different from the first voltage plane.

12. The method as recited in claim 10, further comprising returning the given number of power credits to the second CU in order to reduce number of power credits currently allocated to the first CU.

13. The method as recited in claim 12, further comprising:
operating the first CU in a higher virtual P-state corresponding to a higher average power and a higher power target than a P-state utilized if the first CU used only the respective initial number of power credits; and
maintaining the higher virtual P-state despite a changing workload by alternating between at least two different discrete P-states.

14. The method as recited in claim 9, wherein the number of power credits currently allocated to the first CU exceeds an initial number of power credits allocated to the first CU by a number of power credits borrowed from the second CU, and wherein in response to detecting the amount of current drawn by the first CU exceeds said limit, the method comprises returning fewer than all power credits borrowed from the second CU to the second CU.

15. The method as recited in claim 12, wherein in response to detecting an activity level of a first CU is below a given threshold, the method further comprises:
determining a number of power credits to donate to the first CU based at least in part on an activity level of the first CU; and
borrowing from the second CU the respective number of power credits for use by the first CU.

16. The method as recited in claim 15, wherein responsive to detecting an activity level of the second CU has risen above the given threshold, the method further comprises:
determining a number of power credits for the first CU to return to the second CU based at least in part on the activity level of the second CU; and
causing the first CU to return previously borrowed power credits to the second CU.

17. A computer readable storage medium storing program instructions operable to efficiently transfer power on a die, wherein the program instructions are executable to:
measure an activity level of at least one of a first computation unit (CU) and a second CU, each assigned a respective initial number of power credits;
alternate between at least two discrete power-performance states (P-states) in each of the first CU and the second CU to maintain a respective virtual P-state corresponding to an average power, wherein the average power is a power target based upon a respective current number of power credits; and reduce a number of power credits currently allocated to the first CU, in response to detecting an amount of current drawn by the first CU of given exceeds a given current limit.

18. The storage medium as recited in claim 17, wherein the number of power credits currently allocated to the first CU exceeds an initial number of power credits allocated to the first CU by a given number of power credits, the given number of power credits having been borrowed from the second CU.

19. The storage medium as recited in claim 18, wherein the given current limit is a thermal design current (TDC) value for a voltage regulator utilized by the first CU, wherein the first CU utilizes a first voltage plane and the second CU utilizes a second voltage plane different from the first voltage plane.

20. The storage medium as recited in claim 18, wherein the program instructions are further executable to return the given number of power credits to the second CU in order to reduce number of power credits currently allocated to the first CU.

* * * * *